Sept. 23, 1969　　　　S. E. LONGMAN　　　　3,468,441
AUTOMATIC SUGARCANE PLANTER
Filed Aug. 14, 1967　　　　　　　　　　　　　　6 Sheets-Sheet 1

WITNESS

WITNESS

INVENTOR.
SIDNEY E. LONGMAN
BY

Sept. 23, 1969  S. E. LONGMAN  3,468,441
AUTOMATIC SUGARCANE PLANTER
Filed Aug. 14, 1967  6 Sheets-Sheet 2

INVENTOR.
SIDNEY E LONGMAN
BY
WITNESS  WITNESS

SIDNEY E LONGMAN
INVENTOR.

Sept. 23, 1969 S. E. LONGMAN 3,468,441
AUTOMATIC SUGARCANE PLANTER
Filed Aug. 14, 1967 6 Sheets-Sheet 5

Sept. 23, 1969     S. E. LONGMAN     3,468,441
AUTOMATIC SUGARCANE PLANTER

Filed Aug. 14, 1967     6 Sheets-Sheet 6

WITNESS

SIDNEY E LONGMAN
INVENTOR.

United States Patent Office 3,468,441
Patented Sept. 23, 1969

3,468,441
AUTOMATIC SUGARCANE PLANTER
Sidney E. Longman, R.F.D. Box 195B,
Franklin, La. 70538
Filed Aug. 14, 1967, Ser. No. 660,443
Int. Cl. A01c *19/00*
U.S. Cl. 214—519                                12 Claims

ABSTRACT OF THE DISCLOSURE

A sugarcane planter which cheaply and efficiently plants seed cane is disclosed. The planter has a metal bin with two outwardly sloping sides and a deck extending transversely between the sides. Transverse bulkhead means mounted for longitudinal movement in the bin is provided for delivering an inclined mass of cane stalks to differential conveyor means which seizes the cane stalks from the inclined mass and maneuvers them individually to a programming means. The programming means includes means having preselected stalk receiving apertures as blank spaces, thereby programming the individually delivered stalks for planting and passing them to an elongated mechanical discharging conveyor which centers them in a furrow.

---

This invention relates to improved farm machines, and specifically to an automatic sugarcane planter.

In the planting of sugarcane, a large tonnage of sugarcane must be planted, handled by crane grabs and mechanized conveyors, and be otherwise handled so as to maintain a planting schedule. There are various problems caused by planting requirements, most of the problems being associated with labor costs and sudden planting deadlines. Many of the cane planters of the prior art have failed to resolve these problems. Sugarcane planting can be done either by manual or mechanical means. An apparatus to feed cane to planters who are sowing the same manually is described in U.S. patent application Ser. No. 585,940, filed Oct. 11, 1966, in the name of Sidney E. Longman for Sugar Cane Planting Aid. This machine is in principle a desirable component in the integrated sugarcane planting system herein disclosed. The system, and apparatus, of this invention has to do with a mechanical method of sugar cane planting.

U.S. patent No. 3,073,265 to Movilla et al. teaches a machine which dispenses can precut to specification. Other patents disclose equipment where the precut stalk must adapt a size to a machined dimension, in programmed bins and conveyors. Excessive cutting, however, involves higher sowing costs and more contamination of reproductive plasma. Accordingly, the primary object of this invention is to provide an apparatus which will plant seed can using the entire stalk.

Another primary object of the present invention is to provide an apparatus which seizes cane where it falls from the harvester, with a tractor grab, and places the cane in a bin for transport to a planting machine. The bin may be on a cart, truck or tractor with the cane seed positioned butt down and leaning all in one direction, in a manner similar to the technique required in the aforementioned Sugar Cane Planting Aid in U.S. patent application Ser. No. 585,940.

Another object of the present invention concerns automatic feed of the load of leaning sugarcane to programming circuits of chain, with a feedback slowing signal through interrelated hydraulic loops, and further having automatic stop and start on a vertical roller chain conveyor to prevent jamming, and feedback through a rod-lever circuit to declutch horizontal travel of cane to a programmer means. The programming means automatically selects a quantity of cane required for the "lap planting" as now practiced in the State of Louisiana for saturated sowing.

A third object of this invention is to provide a system to plant curved cane, resulting from hurricane damage, with a minimum of handling. Consistent with this object a modification is provided herein which includes means to saw cane into two or more pieces as the cane proceeds to the final roller-chain circuit. This means includes a plurality of rotary or reciprocating blades with the adjustment of the same being determined by the extent of curvature and depth of the furrow.

A fourth object of this invention, to supplement the third, is to provide a pressure spraying system to continually disinfect the seed as and before it drops into the furrow.

A fifth object of this invention incorporates the sugarcane planting aid of the copending application Ser. No. 585,940 as the means of replenishing seed stock in the sugarcane planter of this invention. The planting aid with its bin load of leaning sugarcane will accommodate its discharge end to the loading end of the planter, and by common mechanical means will pass the cane seed from the planting aid to the planter. A plurality of planting aid units may be necessary to guarantee continuous planting.

A sixth object of this invention, subordinate to the fifth, emphasizes the design of the chassis carrier of the planter of the present invention and of the planting aid, distinguishing the construction of these units from the means of transporting the same. Since all plantations have inventories of vehicles which can be employed to move the planting devices during the sowing season, the planting devices can, optionally, be independent of their carriers.

An additional object of this invention, related to the preceding two objects, is to provide power takeoff drive means to actuate all phases of the sugarcane planter and the planting aid. Such a power takoff drive means simplifies construction and minimizes the expense of planting equipment.

Further objects of the present invention include providing a constant pressure feed of the cane seed to he elevating phase, maintaining the sugarcane stalk in a horizontal position after it is seized from the bin, providing positive progress from the elevating means to the lateral transfer conveying means and into the programming means, and providing interchangeable program disks to select a plurality of sugarcane seed from lap sowing according to the fertility of the seed and the desired saturation of the furrow.

A further object of this invention concerns the dual function of the pusher dolly that maintains the bin load of cane seed within reach of the conveyor system and also serves as a bridging device between the sugarcane planter and the planting aid while replenishing the load of cane.

Other objects will in part be described and in part become obvious as the description proceeds. Reference is, therefore, made to the following detailed description and to the annexed drawings, in which.

Like reference numerals indicate like parts throughout the several views.

Figure 1:
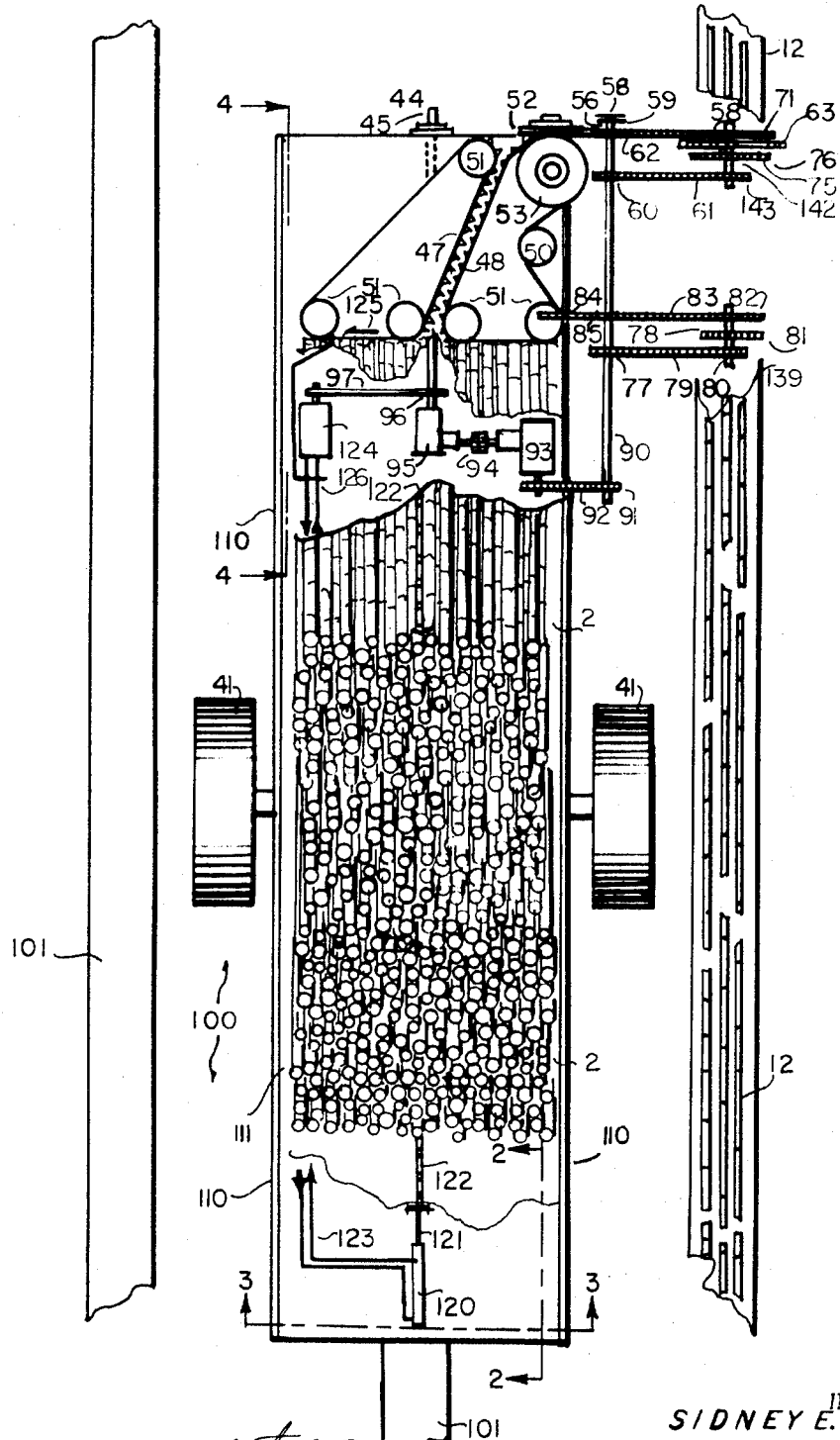
FIGURE 1 is a partially fragmentary plan view of the planter of the present invention.

Since sugarcane planting has special problems inherent in the volume and weight of the seed, and the possible deformed condition resulting from hurricane damage, a brief description of the system of this invention will provide a basis for the latter detailed description thereof.

Harvested sugarcane lies across the ridges, continuously, as it is cut. A tractor with a boom and a forked grabber gathers the stalks, lifts them, butts all the stalks together, and loads the same, butt down, into the bin of a cart. This cart, in the system of this invention, is the planting aid of the aforementioned copending application Ser. No. 585,940. In the bin, the stalks rest against a wheeled partition, which is a steel plate bulkhead at approximately a 45 degree angle mounted on a 4-wheeled dolly, the whole assembly being movable longitudinally in the bin by powered means. When the bin is full it will be conveyed, by whatever motor means is being utilized, to the sugarcane planter. Exchange of the load of cane is effected by backing the load toward the back of the planting machine, while providing vertical and horizontal alignment. The dolly pusher of the planter is jacked by power means to the open end thereof, and swings down in much the same manner as the tailgate of a truck, until the face of the bulkhead plate that normally contacts the cane is level with the deck of the bin, providing a continuation thereof. Coupling means for hitching the planting aid to the planter are provided, such as, for example, steel dowels in the planter which align with corresponding slots in the bin of the planting aid. A bridging link between the planter and the planting aid is formed by the dolly and bulkhead means of the planter. Ratchet tracks of both bins are linked by similar tracks on the bulkhead means. Restraining, or fencing means, on the back of the planting aid bin is removed and hooked between the two bins to provide sugarcane restraining means while the mass of cane is being transferred from one bin to the other. Power is applied to the push-dolly on the planting aid, which then moves the inclined load into the bin of the automatic planter. Since the bulkhead means and the push-dolly of the planting aid are the same as the corresponding means of the automatic planter, they are interchangeable. This means that the dolly and bulkhead means from the planting aid which has moved the sugarcane load onto the automatic planter can either be retracted back to the planting aid or remain on the planter. The dolly and bulkhead means which has swung downwardly in accordance with one aspect of this invention to form the bridging means can then be disconnected from the automatic planter and mounted on the planting aid. This operation is quick and efficient.

As the cane in the planter bin is pushed against the converging sticker chains rotating upwardly on both edges of a slotted and inclined plate, cane stalks are engaged between the stickers. The cane is seized at about 12 to about 16 inches from the butt end thereof and, as the stalks proceed upwardly, gravity lowers the upper end thereof until the cane achieves a horizontal position. At the upper limit of the vertical travel a horizontal conveyor phase takes over, the horizontal conveyor phase generally comprising a faster moving sticker chain which tends to thin the cane feed to a single file. The horizontally moving cane travels into a revolving programmed disk with cresent-shaped openings at predetermined distances along the periphery of the disk, thereby accommodating the number of stalks required for the planting sequence. The tops are simultaneously moved by a second horizontal conveyor chain. The program disk puts the cane stalk into a downward sticker chain conveyor that releases the sugar cane seed into the furrow.

The speed of the towing tractor is interrelated with the cane feed, and they are maintained by automatic devices which are pretuned so as to maintain synchronous and constant planting functions. Single furrow planting in this manner should produce two acres per hour.

Figure 5:
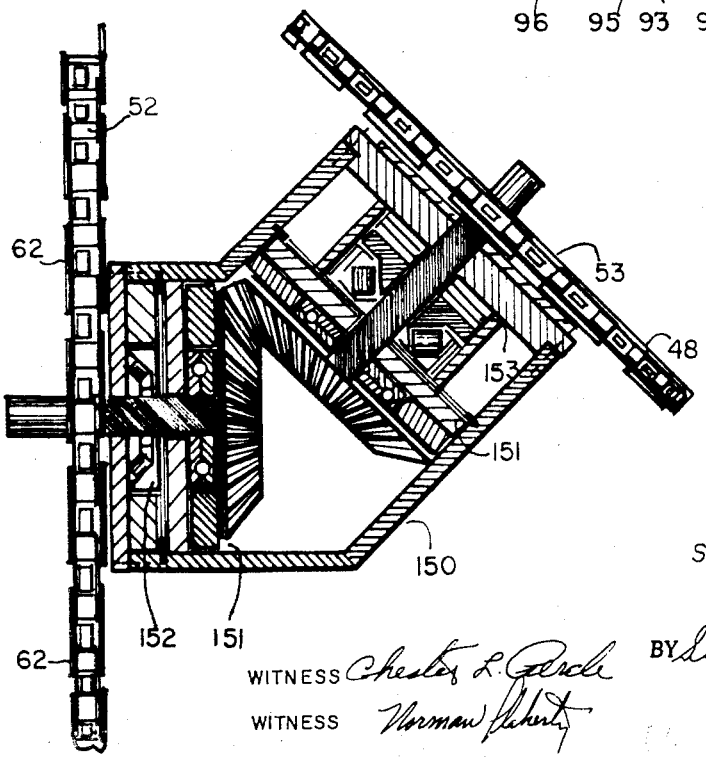
FIGURE 5 is a sectional view of the angle gear assembly shown at 150 in FIGURE 4.

Turning now to the drawings, FIGURE 1 shows a load of sugarcane seed 2 reposing in bin 110 against a bulkhead means (not shown) moved by means of hydraulic ram 120 operating on rod 121 and ratchet 122. The hydraulic ram 120 is controlled by lines 123, pump 124, trigger 125, and manifold 126, powered by shaft 45 through pulley 96 and belt 97. A push-dolly (not shown) on which the bulkhead is mounted thrusts and skids the stalks toward roller chain risers 47 and 48 which are guided by four idler sprockets 51. Idler 50 reverses the motion for chain drive 47. Transfer sprocket 53 drives the lateral assembly from sprocket 52 through the angle gear 150 (FIGURE 5). Sugarcane is seized above the butt between sticker chains 47 and 48 and is then transferred to chain 62 by sprockets 53 and 52, and simultaneously, the top end of the stalk is lifted to the parallel lateral conveyor assembly designated by the numerals 82, 83 and 84. The travel of chain 62 can be accelerated by 10 to 25 percent of the velocity of the risers 47 and 48, by varying sprocket 52.

As mentioned above, power is supplied to the mechanism through splined shaft 45, with the speed then being reduced by gear boxes 93 and 95. Driving chain 92, sprocket 91, and power shaft 90 have conveyor drives on sprockets 77 and 60 and sliding clutch 56 with a feedback controlled as designated by the numerals 58—58.

Figure 6:
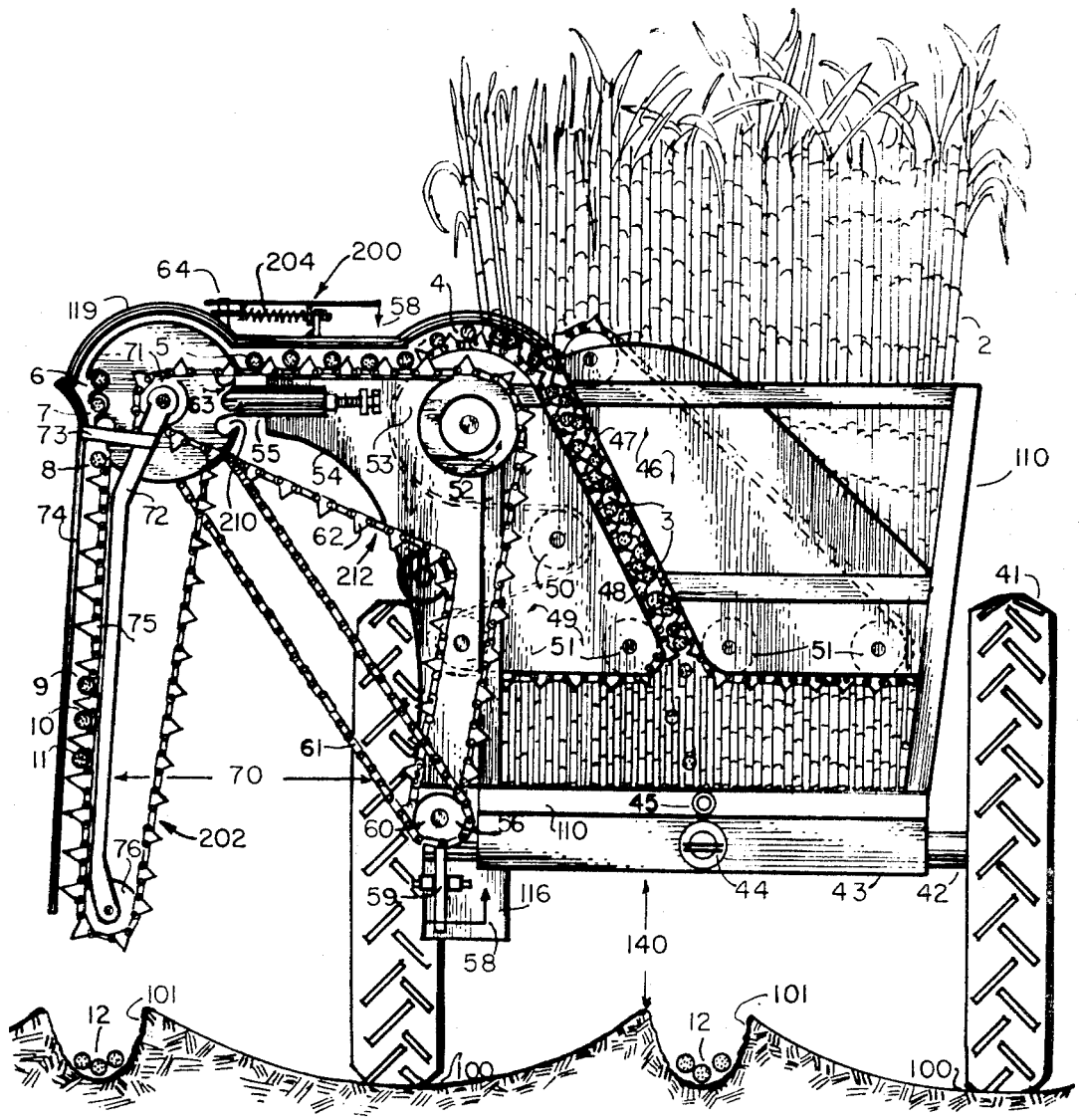
FIGURE 6 is a front elevational view of the planter of FIGURE 1.

The cane seed transported on the lateral chains arrives at the program disk 63 (see FIGURE 6) where crescent shaped notches 210 in the disk circumference admit the cane stalks and turn them by group according to the programmed planting, groups of three being shown in FIGURE 6 as cane stalks 6, 7 and 8, into the fender area 119 and then down chain 75, which rolls on sprocket 76, to the ground, where furrow 101 is fully planted three-lap as at the numeral 12. The cartwheels 41 roll in drain areas 100 between furrows 101.

Figure 2:
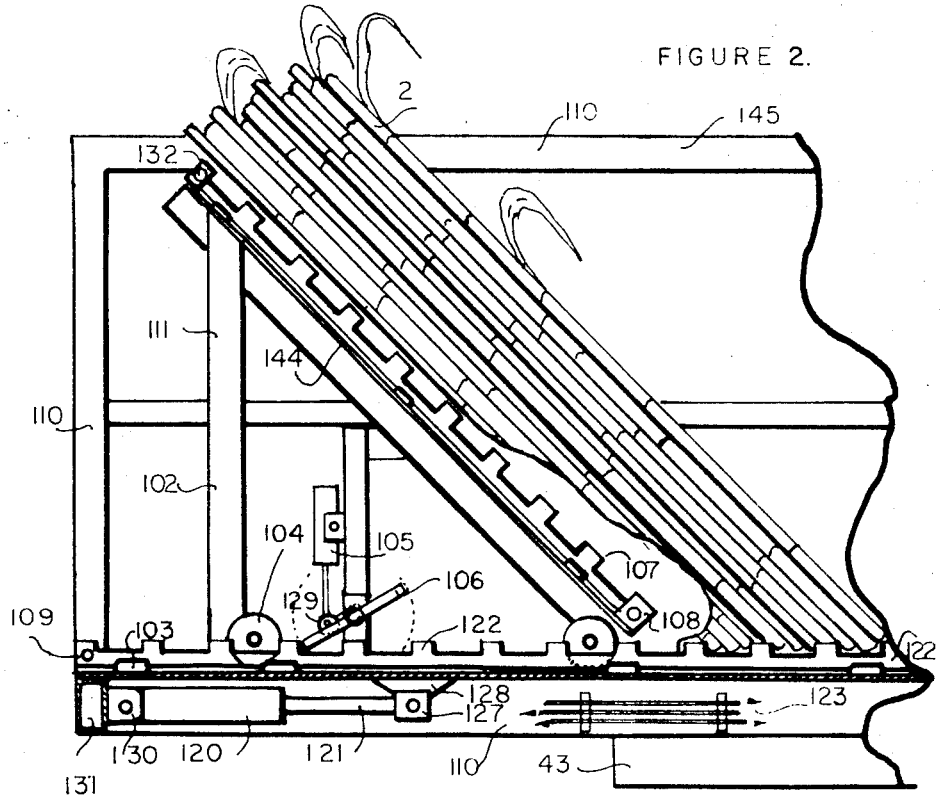
FIGURE 2 is a partially fragmentary elevational view of a cane-skidding dolly in a rearward position, partially in cross-section taken on the line 2—2 of FIGURE 1.
Figure 3:
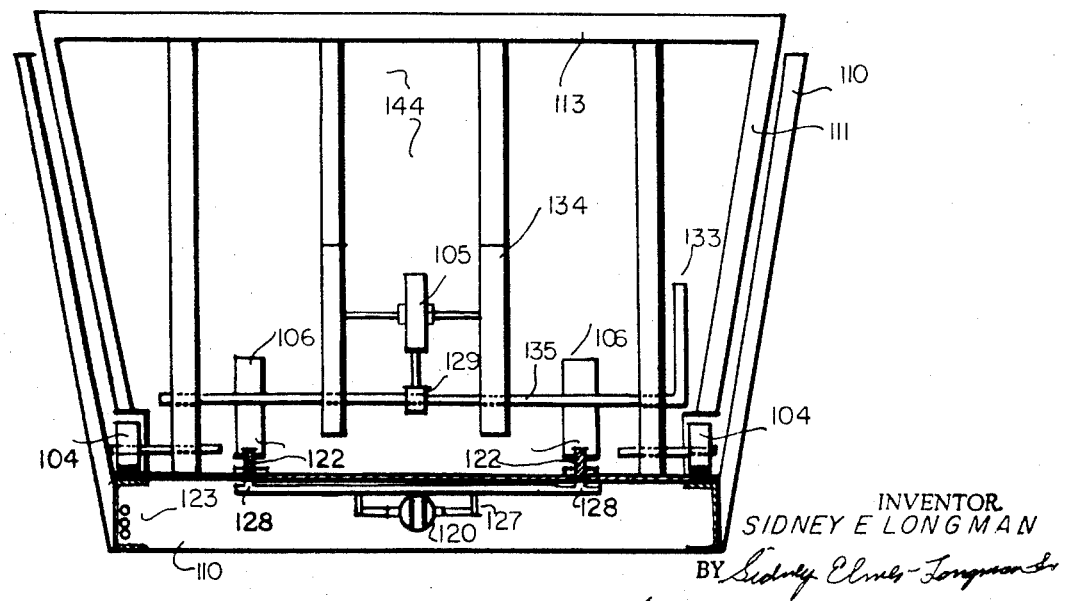
FIGURE 3 is an end elevational view of the cane-skidding dolly of FIGURE 2, partially in cross-section and taken on the line 3—3 of FIGURE 1.

In FIGURES 2 and 3 a rectangular four-wheeled dolly 111 has an inclined deck or bulkhead 144 welded to a channel and angle iron frame chassis 102 and 113. The push dolly 111 is mounted on four antifriction wheels 104 and is free to travel longitudinally on the deck of bin 110 guided by the inside surface of the bin walls 145. Two notched T-bar racks 122 are located on the deck of the bin. A plurality of retainer guides 103, fixedly secured to the deck of the bin as by welding, permit the bar racks 122 to oscillate with the limited stroke of ram rod 121 bolted through head 127 to the beam plate 128 which is welded to the shuttle racks through slots in the deck of the bin by means of gussets. Thus, when the power means 120 which could be a liquid reciprocating servo, an air actuator, or any other similar device, shuttles the bars 122 longitudinally, the two pawls 106 will lock the push-dolly by gravity. In one embodiment the dolly and cane are pushed to the planter in two-notch increments in the shuttle bar 122, and the return stroke allows movement in one-notch increments. The inclination of cane 2 against the inclined bulkhead 144 may slip during the skidding of the load, but feed at the machine is maintained. The bulkhead 144 is inclined at a 45 degree angle, +15 degrees, i.e., from about 30 to about 60 degrees, with 45 degrees being preferred. In order to reverse the travel of the dolly the remote ram or solenoid 105 is reversed thereby flipping eccentric 129 and permitting the pawl 106 to allow reverse travel. A manual reverse 133 for pawls 106 is also provided. Power conduits are enclosed as at 123 by the bin chassis channel. The vehicle carrier chassis is indicated by 43. Upon the inclined deck, or bulkhead, 144 is a section of rack 107 which is generally the same as rack 122. This section of rack 107 serves to permit the push dolly of the aforementioned planting aid to skid its load on and across the push-dolly deck of the planter which forms a bridging apron between the two units. This is described in more detail hereinbelow. Holes 132 and 108 are connections for the shuttle rack extensions from 109. Boxed channel 131 reinforces the jacking ram connection 130.

Figure 4:
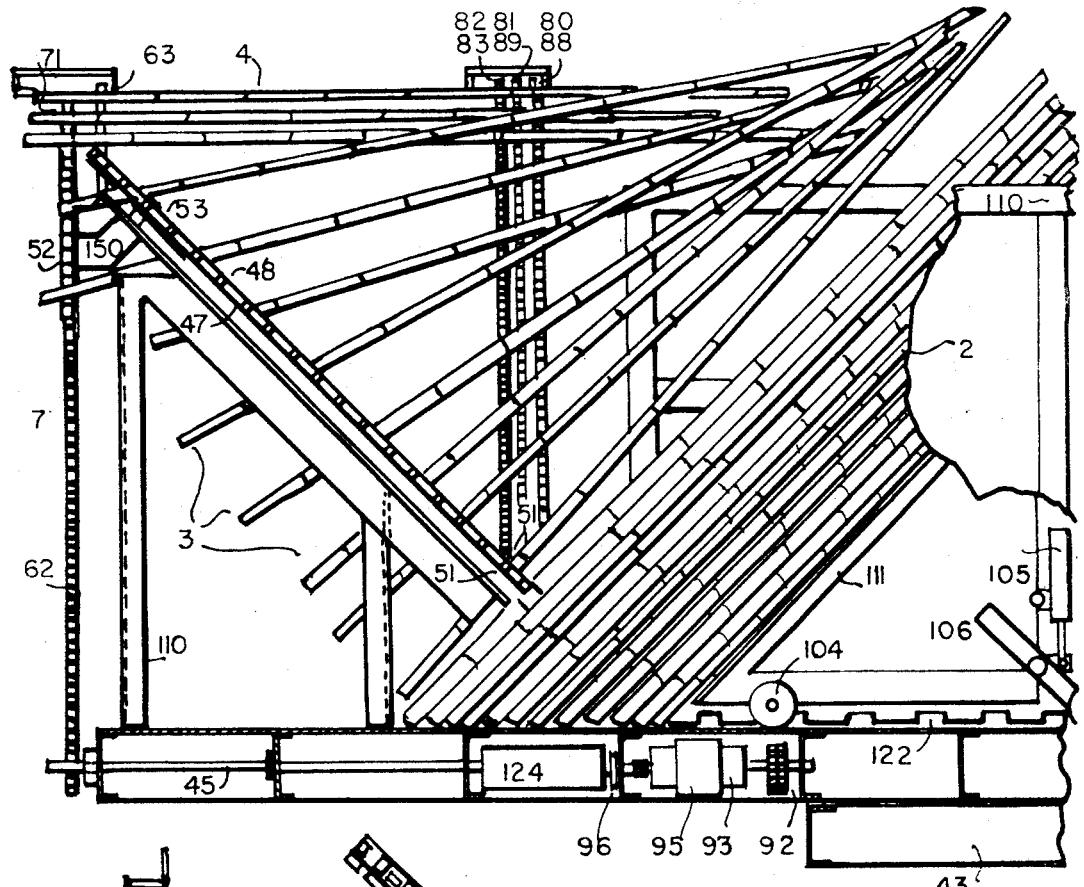
FIGURE 4 is a partially fragmentary elevational view of the gross feed and elevator drives with the dolly in a forward position, partially in cross-section taken on the line 4—4 of FIGURE 1.

FIGURE 4 illustrates the seizure of cane 3 from the load 2 being pushed in bin 110 by push-dolly 111, through ratchet means 122 and pawl 106. Power from mechanical drive shaft 45 is transmitted through chain 92 to the secondary conveyor power shafting detailed in FIGURE 7. The cane seed monuts between sticker chains 47 and 48 and across sprocket 53 of bevel gear assembly 150 which is shown in more detail in FIGURE 5. The larger sprocket 52 moves cane faster on chain 62 and will, therefore, thin out bunched cane stalks from 53.

FIGURE 6 shows the front end of the planter. The cart wheels 41 are running in drains 100. Cane seed 2, 3 and 4 is rising between chains 47 and 48 and is thinned out by mechanism 200 and the faster conveyor generally designated by the numeral 212, comprising sprocket 52, chain 62, and sprocket 71. The programmer 63 times and selects the cane and then releases it into the planting arm defined by the numeral 72 and 74. This is shown by stalks 6 and 7 still in programmer 63, stalk 8 just entering the chain 75, stalk 9, 10, and 11 travelling downwardly in the sticker chain, and the three stalks designated by the numeral 12 already deposited in the furrow 101. The distance designated by the numeral 70 can be regulated by any type of adjusting means such as an adjustable linkage or some other remotely controlled means, thereby regulating the fall of the cane into the center of the furrow. Tow tongue 44 is provided for easy connection to a towing vehicle and power entrance 45 allows for easy connection to an external power source. The clearance between the chassis and the ground is indicated by the numeral 140. Mechanical servo 200 operates through lever 58 and toggle 59 on sliding clutch 56 to check the feed of chain 62 and cane seed that may pile up at position 5. The adjustment at 55 tightens the programmer relative to the plate support 54. The elongated discharging conveyor, or furrow centering means, 202, comprising conveyor 71, planting arm 72–74, chain 75 and sprocket 76, may be manually adjusted by an adjusting means to regulate the distance 70 if planting grid conformity is faithful. Where grid work and engineering are inaccurate, however, constant control by either a furrow follower to move and limit the position of a servo for adjusting distance 70, or a manual means controlled by an operator, is necessary.

Figure 7:
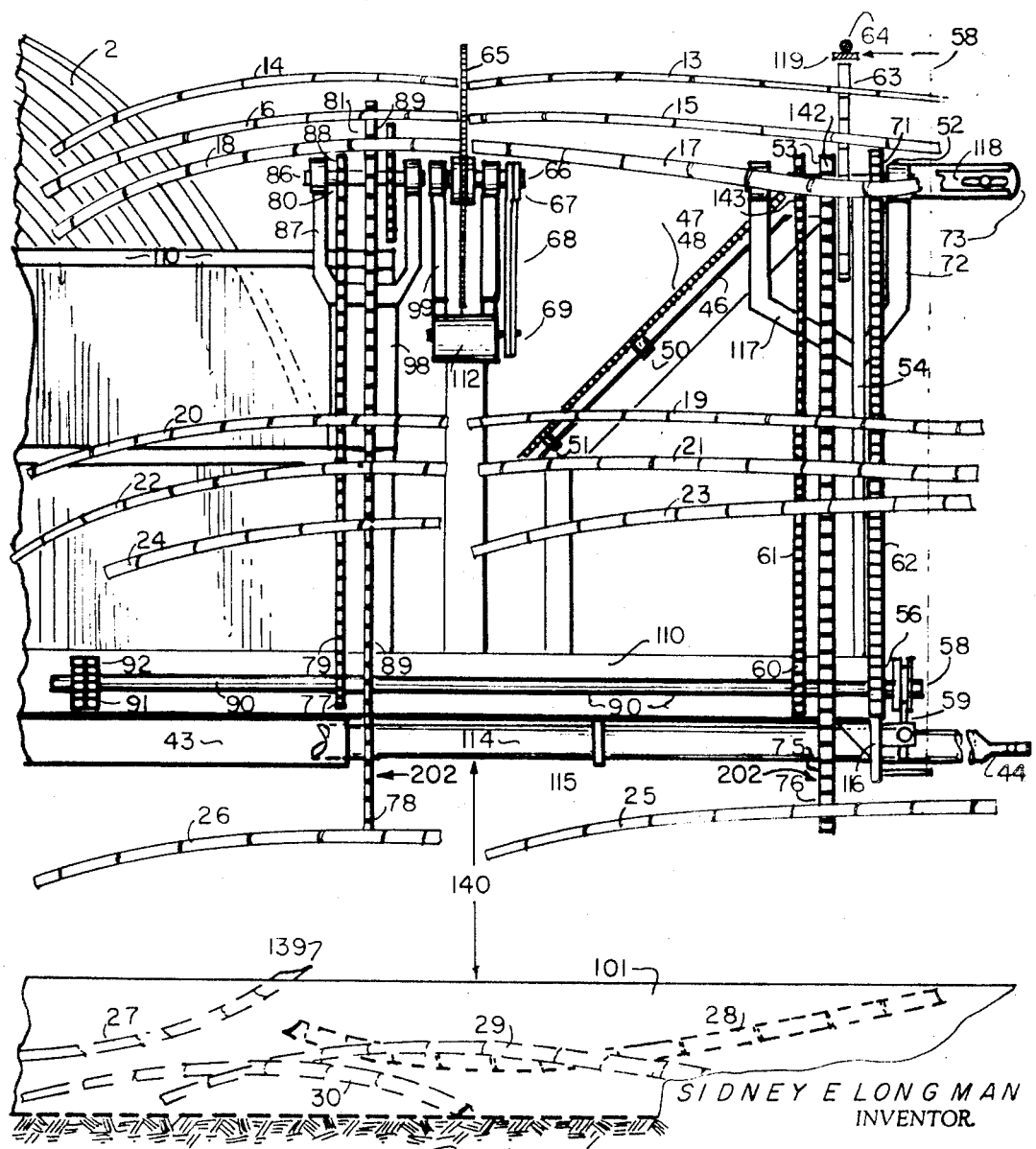
FIGURE 7 is a partially fragmentary side elevational view of the planter of FIGURE 1, showing the curved cane seed.

In the embodiment of FIGURE 7 problems relative to bent or crooked cane are solved. If cane seed 139 projects above the surface of the furrow the operation of covering the seed will not be adequate. Seed in the furrow resembles that designated 28, 29 and 30, when sown in a bent condition. Provision must be made, therefore, to crosscut cane seed into a plurality of pieces when, due to the effects of hurricanes, the crops are deformed. One saw 65 is shown on mandrel 66 with belts 68 from drive pulley 69 which is driven by hydraulic motor 112 mounted in framework means 99. Other saws mounted in a similar manner may supplement the hurricane seeding functions. A programmed string of three pieces of cane seed are shown severed at 13–14, 15–16, and 17–18, on approach to the final chain conveyor, with another group of already cut seed 19–20, 21–22, and 23–24 being lowered to the furrow 101 by chains 89 and 75. Power is provided by chain drives 79 and 61 fed from shafting 90 and turning jack-shafts 86 and sprockets mounted thereon at 88 and 89. The framework indicated at 87, 98 and 72, 117 comprises conventional forked mandrel support assemblies with angle iron attachments to the planter chassis. A friction member 74 (FIGURE 6) to press the cane being lowered on the final loops to the furrow is attached at 73 and pressure adjusted by spring loaded wingnut 118. A similar means to maintain cane on the chain 79 is also required until the stalk arrives at the end 72 and 78 of the mechanical discharge conveyor 202. Servo control 200 for jammed feed at the program disk 63 comprises servo 64, spring loaded shoe 119, adjusted by coil spring 204 and tension nut 64, transmitting signals to the rod and lever system 58 and to splined sliding clutch 59. Simple machine elements may be used since this assembly operates at slow speed.

Figure 8:
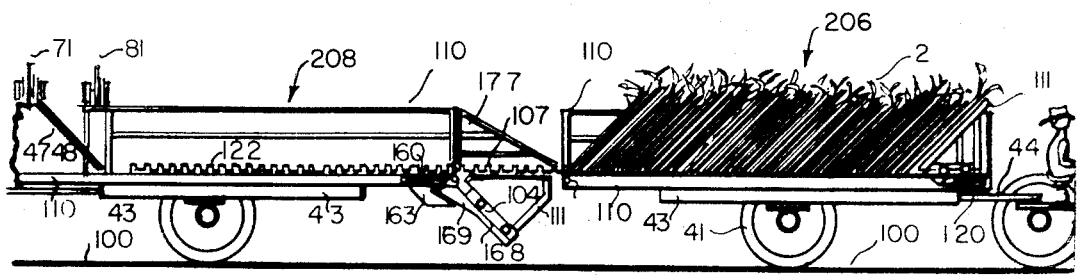
FIGURE 8 is a partially fragmentary, schematic view of the system of this invention.
Figure 9:
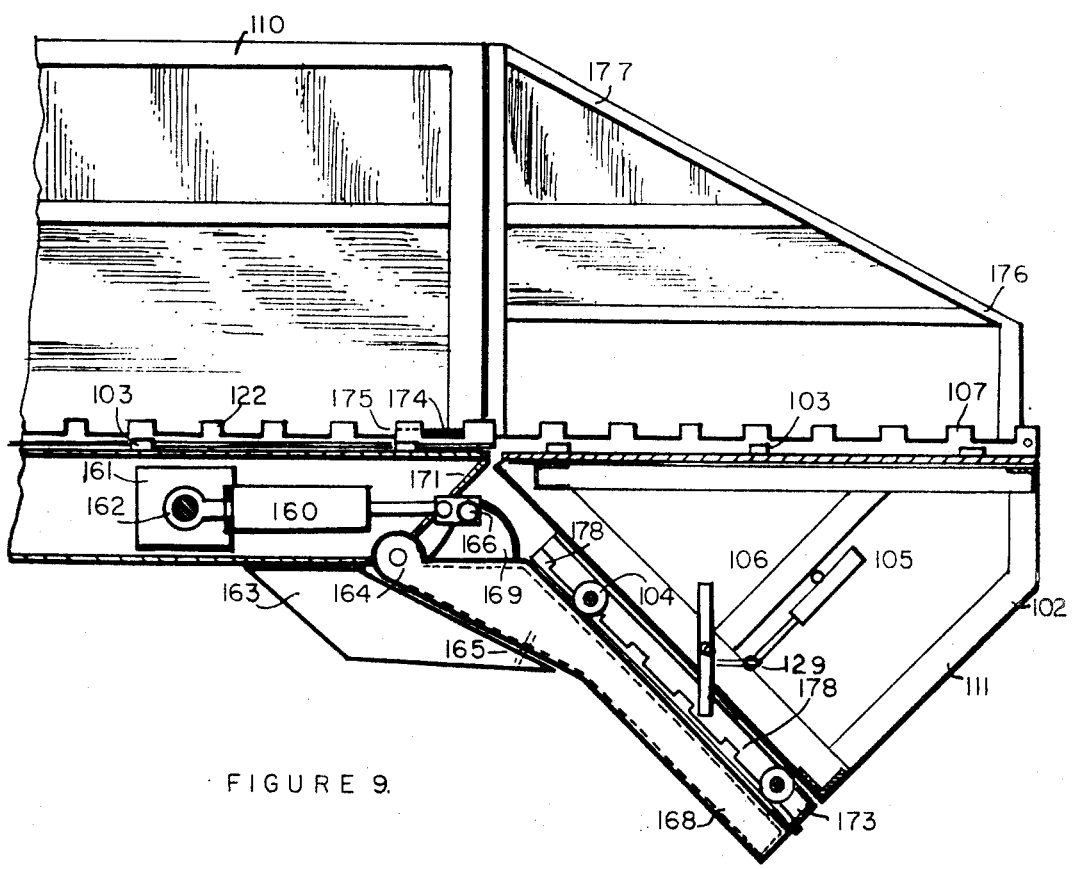
FIGURE 9 is a more detailed view of the transferring means of FIGURE 8.

In FIGURE 8 is illustrated schematically the replenishing position of the aforementioned planting aid 206 while servicing the planter 208 with a three to four ton load of sugar cane seed. Both units on wheeled carts 43 are stopped in drains 100. The chassis are noted as 110. The planting aid 206 is backed up to the planter 208 and is prepared to push the load of leaning cane 2 into the sower. The operator of the sower has lowered gate 168 to limit stop 163, which is shown in detail in FIGURE 9. Limit stop 163 is a plate welded to the chassis and contains a shimming or screwing fine adjustment at 165. Servo ram 160 hinges on the shaft 162 which is on the fish plate 161. Gate 168 swings on hinge 164 and is articulated by cam 166 through a slot in tail beam 171. The push-dolly 111 has entered channel guides 173 with four wheels 104 retained securely before the lowering phase begins. The alignment of rack 122 with the rack section 107 is effected, and the two rack segments are locked by flat plate key 174 welded on short segment 178. Upon lifting the dolly 111 again, this key 174 at a 45 degree angle permits normal operation of the rack 122. To facilitate the cane stalk transfer, wing walls 176 and 177 are welded to planter 208 and are cantilevered and flared slightly in a funnel-like vertical and longitudinal axis. The alignment having been achieved, the tractor operator on the planting aid 206 actuates the servo 120 thereon and pushes dolly 111 with its load of cane 2 into the bin of the planter 208 over the bridge effected by the faceplate, or bulkhead, of the dolly now hinged between the two units. When the push is terminated the dolly from the planting aid 206 is retracted by servo 120 and the cane delivery unit goes for more cane. The sowing machine operator retracts servo ram 160 and sets the dolly 111 upright. When tailgate 168 hits tailbeam 171 rack 122 is aligned and joined to segment 178.

The entire operation of seed transfer may be effected by the two tractor personnel from their respective seats without manual application in the area of the tail gates.

It is, therefore, clear that the above-described invention includes a sugarcane planter which has a metal bin of two outwardly sloping sides and a deck extending transversely between the sides, transverse bulkhead means mounted for longitudinal movement in the bin for delivering an inclined mass of cane stalks to differential conveyor means, with the differential conveyor means being adapted to seize the cane stalks from the inclined mass and maneuver the same individually, horizontally, to a programming means, the programming means including means having preselected stalk receiving apertures and blank spaces, whereby the individually delivered stalks are programmed for planting, and an elongated mechanical discharging conveyor to center the cane stalks in a furrow.

Thus, it can be seen clearly that the objects set forth at the outset of the specification have been successfully achieved.

Accordingly, what is claimed is:

1. In a sugarcane planter, the combination of a metal bin of two outwardly sloping sides and a deck extending transversely between said sides, transverse bulkhead means mounted for longitudinal movement in said bin for delivering an inclined mass of cane stalks to differential conveyor means, said differential conveyor means being adapted to seize said cane stalks from said inclined mass and maneuver the same individually, horizontally to a programming means, said programming means including means having preselected stalk receiving apertures and blank spaces, whereby the individually delivered stalks are programmed for planting, and an elongated mechanical discharging conveyor to center said cane stalks in a furrow.

2. A sugarcane planter as defined in claim 1, including a feedback power control means for controlling the movement of said mass of sugarcane by said transverse bulkhead means, thereby maintaining optimum feed pressure at said differential conveyor means.

3. A sugarcane planter as defined in claim 1, further including a reciprocal thrust power means coupled to pawl and ratchet means for longitudinally moving said transverse bulkhead means.

4. A sugarcane planter as defined in claim 1, wherein said transverse bulkhead means is supported on dolly means, said dolly means being mounted for movement on a plurality of antifriction wheels.

5. A sugarcane planter as defined in claim 1, wherein said transverse bulkhead means is inclined rearwardly at an angle of about 30 to about 60 degrees, from the horizontal.

6. A sugarcane planter as defined in claim 5, wherein said angle is about 45 degrees.

7. A sugarcane planter as defined in claim 1, further including a longitudinal extension of said deck of said bin, said longitudinal extension being hingedly connected to said deck at the rear end thereof such that said extension can swing downwardly, said longitudinal extension also containing an extension of said pawl and ratchet means such that said bulkhead means can be moved onto said extension when said extension is in the extended position, and track channel means to guide and retain said bulkhead means on said extension.

8. A sugarcane planter as defined in claim 7, further including power means for raising and lowering said extension with said bulkhead means thereon such that, when said extension means is lowered, said bulkhead means then forms an extension of said deck, whereby said load of said cane can be replenished, after which said extension is raised by said power means to its operating position.

9. A sugarcane planter as defined in claim 8, in combination with a planting aid, said planting aid comprising a bin with a deck extending transversely between two sides, transverse bulkhead means mounted for longitudinal movement in said bin for delivering an inclined mass of cane stalks to said bulkhead means forming said extension of said deck of said planter.

10. A sugarcane planter as defined in claim 1, further including a differential speed means combined with means to change the direction of flow of cane, whereby slow, vertical movement of said cane is translated to fast, horizontal movement for feeding into said programming means.

11. A sugarcane planter as defined in claim 1, wherein said programming means comprises a metal disk having pre-selected stalk receiving apertures cut into the circumference thereof and blank spaces at predetermined intervals along said circumference.

12. A sugarcane planter as defined in claim 1, further including a roller chain gathering and seizing means at right angles to said inclined mass of cane stalks for receiving said cane stalks and conveying the same to said programming means.

References Cited

UNITED STATES PATENTS

| | | |
|---|---|---|
| 2,617,556 | 11/1952 | Hulett. |
| 2,712,388 | 7/1955 | Skromme et al. _____ 214—82 |
| 2,803,357 | 8/1957 | Ronfeldt _____ 214—82 |
| 2,840,269 | 6/1958 | Anderson. |
| 3,073,265 | 1/1963 | Movilla et al. _____ 111—3 |

ALBERT J. MAKAY, Primary Examiner

U.S. Cl. X.R.

111—2; 214—82